United States Patent [19]

Gaffney

[11] 4,290,984

[45] Sep. 22, 1981

[54] METHOD FOR TREATING REFRACTORY BLOCK

[75] Inventor: LeRoy J. Gaffney, Munster, Ind.

[73] Assignee: Inland Steel Company, Chicago, Ill.

[21] Appl. No.: 82,918

[22] Filed: Oct. 9, 1979

[51] Int. Cl.$^3$ .............................................. C04B 41/24
[52] U.S. Cl. ....................................... 264/30; 264/62; 264/131; 264/133
[58] Field of Search ..................... 264/30, 62, 131, 133

[56] References Cited

U.S. PATENT DOCUMENTS

| | | | |
|---|---|---|---|
| 2,792,214 | 5/1957 | Eusner .................................. | 266/43 |
| 3,681,113 | 8/1972 | Yoldas ............................... | 264/30 X |
| 3,708,317 | 1/1973 | Owen ................................. | 264/30 X |
| 3,943,216 | 3/1976 | Bakker ............................... | 264/30 X |
| 4,077,808 | 3/1978 | Church .............................. | 106/40 R |

*Primary Examiner*—Thomas P. Pavelko

*Attorney, Agent, or Firm*—Merriam, Marshall & Bicknell

[57] ABSTRACT

A block is formed from uncured grains of refractory material. The block is sintered to fully cure the block which, as sintered, has pores extending inwardly from the surface of the block. The fully cured block is soaked in a first liquid to impregnate the block with the first liquid which, upon heating, forms into a material which at least partially fills the pores, and the filling material is compatible with the original refractory material of the block. The block is then soaked in a second liquid containing very fine particles of refractory material which are deposited in the partially filled pores. Upon heating, the very fine particles are reacted with a compound at least part of which originates with the first liquid to form a reaction product which further fills the pores. These procedures enhance the resistance of the block to slag penetration.

25 Claims, No Drawings

4,290,984

METHOD FOR TREATING REFRACTORY BLOCK

BACKGROUND OF INVENTION

The present invention relates generally to methods for manufacturing refractory blocks used in lining a furnace in which is conducted a process which produces slag, and more particularly to a method for treating a refractory block to improve its resistance to slag penetration.

In a typical manufacturing operation for forming a refractory block, a mixture of coarse and fine grains of uncured refractory material are initially formed into a block consisting essentially of relatively coarse grains in a matrix of relatively fine grains located in the interstices between the coarse grains. The fine grains are composed of a refractory material which is either the same as the refractory material of which the coarse grains are composed or of a refractory material which is compatible with the refractory material in the coarse grains, or both. A refractory material is compatible with another refractory material if it does not flux or reduce the melting point of the other refractory material during high temperature operating conditions.

The uncured block of refractory material has pores extending from the surface of the block inwardly along the matrix in the interstices between the coarse grains.

After formation, the uncured block of refractory material is subjected to a sintering operation to form a fully cured block of refractory material. The fully cured block is less porous than the unsintered block, but it still has some pores extending from the surface of the block inwardly along the matrix, and, during operating conditions in a furnace, slag can enter the pores in the fully cured sintered refractory block. These pores have cross-sectional spaces which are sufficiently large to permit penetration by the slag.

When a refractory block is penetrated by slag, the refractory block undergoes deterioration for a thickness substantially equal to the depth of slag penetration. More particularly, slag which has penetrated into the pores of the refractory block reacts with the refractory in the interior of the block, creating a new mineral different in composition from the rest of the refractory block. This new mineral expands and contracts at a rate different than the rest of the refractory block, creating a condition known as spalling in which layers of refractory material one to two inches thick flake off from the refractory block. Spalling reduces the effectiveness of the refractory block and reduces the life of the refractory lining composed of such refractory blocks, and this is undesirable.

Normally, refractory blocks are provided with a composition which has a minimal reaction with the slag, but such reactions can never be eliminated completely because, in order to do so, the refractory would have to be composed of material exactly the same as the slag, and this would cause the refractory block to become molten during operation of the furnace. Moreover, the slag from the furnace processing operation varies in composition during processing, so that a refractory composition which has a minimal reaction with a slag of one composition could have increased reaction when the slag undergoes a change in composition.

Among the prior art, Eusner, et al. U.S. Pat. No. 2,792,214 teaches that the rate of refractory deterioration can be reduced by reducing the porosity of the refractory block. Eusner discloses impregnating the refractory block with molten metal to fill the pores of the block and then oxidizing the metal to form a refractory metal oxide.

Church, et al. U.S. Pat. No. 4,077,808 teaches impregnating a ceramic block, composed of alumina, with phosphoric acid and then heating to react the phosphoric acid with the alumina to produce a complex aluminum phosphate which fills or partially fills the pores in the ceramic block, to harden and strengthen the ceramic block.

The ceramic block, thus hardened and strengthened, is used for mechanical or structural purposes. Church teaches that the ceramic block must be in an uncured or unsintered state in order to accomplish the aims of the Church procedure. If the ceramic block is fully cured before it is subjected to Church's impregnating step, the block is insufficiently porous to accomplish the aims of the Church procedure. Church also contemplates subjecting the ceramic block to an impregnating treatment with a solution of a metal salt which, upon heating, can be converted into a metal oxide, to fill or partially fill the pores of the uncured ceramic block, but this impregnating step must be performed before the step in which the ceramic block is impregnated with phosphoric acid or, according to Church, the treatment will not work. According to Church, a procedure in which impregnation with phosphoric acid precedes impregnation with a salt solution convertible to an oxide, has been found to produce a block retaining a high degree of porosity.

In describing the importance of assuring that the ceramic block is uncured when it undergoes the impregnation treatments described in the Church patent, Church states that the production of strongly bonded refractory materials has been found to require the presence of small pores, gaps, cracks or interstices and that, if these spaces are too small, then the chemical solution cannot penetrate properly.

SUMMARY OF THE INVENTION

The present invention constitutes a method for improving the resistance to slag penetration of a refractory lining block for a furnace in which is conducted a process which produces slag. In one embodiment, the method comprises the step of forming a porous block of uncured refractory material consisting essentially of relatively coarse grains of a first refractory material in a matrix of relatively fine grains of any refractory material which is compatible with the refractory material in the coarse grain. The fine grains can be either the same material as the material of the coarse grains or a material which does not flux the material of the course grain, both being included within the term "compatible."

The porous block of uncured refractory material is then sintered to form a fully cured block which is less porous than was the unsintered block but which still has some pores extending from the surface of the block inwardly along the matrix between the coarse grains. These pores have cross-sectional spaces which are sufficiently large to permit penetration by slag.

In order to increase the block's resistance to penetration by slag, the block is subjected to two impregnating steps. In the first impregnating step, the block is soaked in a first liquid which penetrates the pores of the block and impregnates the block. This first liquid has a composition which reacts with the refractory material in the block to form, in the matrix, a reaction product which is compatible with all the refractory material in the block and which, upon formation, reduces the pore size, i.e., the cross-sectional area of the pores, to decrease the penetrability of the pores by the slag. After the soaking step, the block is removed from the first liquid and heated, while still impregnated with the first liquid, to promote the reaction for forming the reaction product and to fuse together, by the heat of the reaction, discrete portions of the reaction product.

After the heating step, the block is soaked in a second liquid containing very fine particles of a refractory material which is compatible with the refractory material of which the block is composed and with the reaction product, to impregnate the block with the second liquid and deposit the very fine particles contained in the second liquid in the pores of the block, to further decrease the penetrability of the pores by the slag.

As the first reaction product forms in the pores, it expands to fill the pores, and in one case the expansion occurs in an exfoliative manner. This reduces the cross-sectional space in the pores and reduces substantially the extent to which slag can penetrate each of the pores. However, in most instances, some slag is still capable of penetrating the pores, and this is undesirable.

When the fine particles in the second liquid are deposited in the pores, this further decreases the cross-sectional spaces in the pores to such an extent that, for slags having surface tensions conventionally encountered in most slag-producing processes, the pores are impenetrable to the slag, notwithstanding the existance of small, open pore mouths at the surface of the refractory block.

Because the cross-sectional space of the pores, before impregnation with the second liquid, is relatively small, it is important that the particles in the second liquid which are to undergo deposition within the pores, are of a very fine size. Otherwise, these particles could not enter the pores. For example, in a typical embodiment, the fine particles of refractory material which are normally present in the matrix of the refractory block, before sintering, have a size in the range minus 100 to minus 200 mesh. The very fine particles which are deposited in the pores upon impregnation with the second liquid have a size in the range of minus 600 mesh (minus 2 microns).

The refractory material, of which the very fine particles are composed, is reactive with the first impregnating liquid to produce a reaction product which is compatible with the refractory material in the block and which will be retained within the pores. Unless the very fine particles react to form such a reaction product, they will be loose within the pores in the same state in which they entered, and may not be readily retained within the pores. In some instances, the block may contain sufficient residual first liquid, at the time of the second soaking step, to react with the very fine particles to produce a desired reaction product. However, in those instances where the block does not contain sufficient residual first liquid, the block may be soaked a second time in the first liquid, after the very fine particles have been deposited in the pores, to provide the necessary first liquid for producing the desired reaction product upon reaction with the material of which the very fine pores are composed. As with the first impregnating step, heating may be necessary, after soaking, to promote the desired reaction.

After being subjected to the impregnating and reacting treatments described above, the block is ready to be assembled with other such blocks into a furnace refractory lining having a relatively high resistance to slag penetration.

In another embodiment of the present invention, the method comprises the following steps. First, a block of uncured refractory material is formed and then sintered to produce a fully cured block, less porous than the unsintered block, but having some pores extending inwardly from the surface of the block. These pores have cross-sectional spaces which are sufficiently large to permit penetration by slag.

The block is then soaked in a first liquid which penetrates the pores and impregnates the block. The impregnated block is then subjected to a first heating step under conditions which form, from the first liquid, a product which is compatible with the refractory material of which the block is composed and which, upon formation, builds up as a layer on the grains of refractory material already in the block. This reduces the pore size, i.e., the cross-sectional area of the pores, to reduce the penetrability of the pores by slag.

Thereafter, the block is soaked in a second liquid containing very fine particles of a refractory material which is compatible with the refractory material of which the block is composed and with the product formed during the first heating step. This impregnates the block with the second liquid and deposits the very fine particles in the pores of the block to further decrease penetrability of the pores by slag.

After the second soaking step, the block is fired, either before or after it is assembled into the refractory lining of a furnace. During firing, the refractory material of which the very fine particles are composed forms a ceramic bond with the product formed during the first heating step. This enhances the retention of the very fine particles within the pores. In addition, during the first step, in most cases, a ceramic bond is formed between the product formed during the first heating step and the original refractory material of the block. In other cases, the product formed during the first heating step has the same composition as the primary material of which the refractory block was originally composed, and the product then forms an additional layer upon the original refractory material.

After the two impregnating and heating steps, the pores of the block have cross-sectional spaces which are sufficiently small as to be substantially impenetrable to slag. For reasons explained above, this condition of impenetrability occurs notwithstanding the existance of small, open pore mouths at the surface of the refractory block.

Other features and advantages are inherent in the method claimed and disclosed or will become apparent to those skilled in the art from the following detailed description.

DETAILED DESCRIPTION

In one embodiment in accordance with the present invention, a block of refractory material is formed from relatively coarse grains of alumina in a matrix of relatively fine grains of alumina and chromia. The coarse grains of alumina constitute about 70-80% of the refractory block and have a particle size of plus 100 mesh. The fine grains of alumina in the matrix constitute about 10-15% of the refractory block and have a particle size of minus 100 mesh. The fine grains of chromia in the matrix constitute about 10-15% of the refractory block and have a particle size of minus 200 mesh.

The coarse grains of alumina and the fine grains of alumina and chromia are formed into a porous block of uncured refractory material and then sintered in a conventional manner to form a fully cured block which is less permeable than the unsintered block, but which still has some pores extending from the surface of the block inwardly along the matrix between the coarse grains, and these pores have cross-sectional spaces which are sufficiently large to permit slag to penetrate through the pores into the interior of the refractory block. Penetration of slag is reduced by subjecting the block to a pair of impregnating steps.

In the first impregnating step, the block is soaked in phosphoric acid having a concentration in the range 50–95% (85% preferred). The phosphoric acid enters the pores of the refractory block and reacts with the fine grains of alumina in the matrix and with adjacent surface portions of coarse alumina grains to form an aluminum ortho-phosphate reaction product which is compatible with both the alumina and chromia in the block and which, upon formation, reduces the cross-sectional area of the pores to decrease the penetrability of the pores by the slag. The aluminum ortho-phosphate reaction product replaces some of the fine alumina particles entirely and other of the fine alumina particles partially and also forms along the outer surface portions of the coarse alumina particles adjacent the pores.

Formation of the aluminum ortho-phosphate reaction product is enhanced by removing the block from the phosphoric acid in which it was soaking and then heating the block, while still impregnated with the phosphoric acid, to promote the reaction between the alumina and the phosphoric acid and to fuse together, by the heat of the reaction, discrete portions of the aluminum ortho-phosphate reaction product. The heating step is conducted at a temperature typically in the range 400°–450° F. (204°–232° C.). The temperature at which the heating step is conducted is no higher than necessary to promote the reaction between the phosphoric acid and the alumina.

Upon formation, the aluminum ortho-phosphate reaction product expands, typically in an exfoliative manner, to fill or partially fill the pores, thereby reducing the cross-sectional space into which slag may penetrate.

Notwithstanding the fact that the size of the pores is reduced, thereby impeding penetration of the pores by slag, it may still be possible for some slag to penetrate the pores, and this is undesirable.

Accordingly, after the heating step, the block is subjected to a second impregnating step wherein the block is soaked in a second liquid comprising water containing very fine particles of alumina (e.g., less than 2 microns (minus 600 mesh)). This impregnates the block with the second liquid and deposits the very fine particles of alumina within the pores, to further decrease the penetrability of the pores by the slag. It is important that the second liquid contain very fine particles of alumina in the size range set forth above. This is because, if the particles in the second liquid were too large, these particles could not enter the pores as the latter have a reduced size resulting from the formation therein of aluminum ortho-phosphate formed after the first impregnating step.

To retain the very fine alumina particles in the pores and keep them from falling out, it would be desirable to react the very fine aluminum particles with phosphoric acid to produce particles of aluminum ortho-phosphate reaction product which would fuse together from the heat of reaction or expand, or both. Such a reaction product, formed from the very fine alumina particles, would be retained within the pores and would not fall out as might be the case with the very fine alumina particles when they were merely deposited within the pores.

A reaction between the very fine alumina particles and phosphoric acid can be accomplished in two ways. In one way, the reaction occurs between the very fine alumina particles and any residual phosphoric acid which remains unreacted within the refractory block after the heating step following the first impregnating step. Another way comprises soaking the refractory block in phosphoric acid after removing the block from the second liquid containing the very fine alumina particles. When using either of these two ways it may be necessary to subject the block to another heating step, in the same temperature range as the heating step described above. This second heating step promotes the reaction between the alumina in the very fine particles and the phosphoric acid with which the block is impregnated to form the desired aluminum ortho-phosphate reaction product.

Examples of another embodiment of a method in accordance with the present invention are set forth below.

In all of these examples, the refractory block is subjected to a plurality of processing steps, in the following sequence: a first soaking step, a first heating step, a second soaking step and a second heating step. Some of the features and conditions of these examples are summarized in Table I, below.

TABLE I

| Ex. | Composition of Refractory Block | First Soaking Liquid | First Heating Step | Second Soaking Liquid | Second Heating Step |
|---|---|---|---|---|---|
| A | Magnesia | Chromic acid | 2000° F. (1093° C.) in reducing atmosphere | alumina suspension | above 2800° F. (1538° C.) |
| B | Magnesia | Chromic acid | Same as "A" | silica suspension | above 2800° F. (1538° C.) |
| C | Silica | Chromic acid | Same as "A" | silica suspension | above 2800° F. (1538° C.) |
| D | Silica | Chromic acid | Same as "A" | magnesia suspension | above 2800° F. (1538° C.) |
| E | Alumina | Chromic acid | Same as "A" | magnesia suspension | above 2800° F. (1538° C.) |
| F | Silica | Silicic acid | Boiling point for silicic acid | Chromia suspension | above 2800° F. (1538° C.) |
| G | Magnesite-chrome | Chromic acid | Same as "A" | Magnesia suspension | above 2800° F. (1538° C.) |

The magnesia block of examples A and B may have a composition consisting essentially of 90–99 wt.% MgO with the balance being impurities such as $Al_2O_3$, $Fe_2O_3$, CaO and $SiO_2$.

The silica block of examples C, D and F may have a composition consisting essentially of 95–98% $SiO_2$ with the balance being impurities.

The alumina block of example E may have a composition consisting essentially of 60–99 wt.% $Al_2O_3$ and 5–39 wt.% $SiO_2$ with any balance being further impurities.

The magnesite-chrome block of example G may have a composition consisting essentially of 55–89 wt.% MgO, 4–30 wt.% $Cr_2O_3$, 3–18 wt.% $Fe_2O_3$, 2–30 wt.% $Al_2O_3$ and 1–20 wt.% $SiO_2$.

The refractory blocks of examples A through G may be composed of grains having grain sizes conventionally available in commercial refractory blocks used for lining furnaces in which are performed processes producing slag. A typical range for such grain sizes is as follows:

| | |
|---|---|
| +8 mesh | 11% |
| −8 mesh to +20 mesh | 27% |
| −20 mesh to +100 mesh | 26% |
| −100 mesh | 36% |

The chromic acid ($H_2CrO_4$) and silicic acid ($H_2SiO_3$) of the examples may each have a concentration in the range 50–100%, with a saturated (or even supersaturated) concentration preferred.

The first heating step of examples A through E and G may be conducted in an atmosphere of carbon monoxide (CO) to reduce to $Cr_2O_3$ the $CrO_3$ remaining after the $H_2O$ is driven off from the chromic acid ($H_2CrO_4$). The chromia ($Cr_2O_3$) which remains builds up as a layer on the grains of refractory material originally in the block.

The first heating step of example F boils off the $H_2O$ from the silicic acid leaving $SiO_2$ (silica) which builds up as a layer on the grains of refractory material originally in the block. In lieu of silicic acid, the first soaking liquid may comprise ethyl orthosilicate dissolved in alcohol or other liquid reagent containing $SiO_3^{--}$ ion.

The alumina suspension of example A may be composed of very fine particles (minus 1 micron) of alumina suspended in water and may have the consistency of a slurry.

Preferably, in the first soaking step of all the examples, the refractory block is immersed in a first soaking liquid which has been heated to its boiling point. This agitates and expels from the pores of the block air which is entrapped in the pores, thereby assisting in reducing porosity during the subsequent processing steps.

The silica suspension of examples B and C is composed of about 75–80 wt.%, for example, of very fine particles (minus 1 micron) of silica ($SiO_2$) suspended in a conventional, commercially available liquid reagent containing about 75–80 wt.% $SiO_3^{--}$ ion in water.

The magnesia suspension of examples D, E and G may be composed of very fine particles (minus 1 micron) of magnesia suspended in water.

The chromia suspension of example F may be composed of very fine particles (minus 1 micron) suspended in a liquid reagent of the type described above in connection with examples B and C.

The very fine particles of alumina and magnesia, in examples A, D, E and G may be suspended in liquid media other than water, e.g., alcohol, ether, gasoline or other appropriate liquid hydrocarbons.

The concentration of the very fine particles in the liquid carrying medium is preferably the maximum concentration that will maintain the very fine particles in suspension, and the liquid utilized as the carrying medium is preferably that liquid which will maximize the amount of very fine particles which will be maintained in suspension.

The second heating step is a firing step which may be conducted prior to the assembly of the refractory block into the refractory lining of a furnace or after assembly, during an initial fire-up of the furnace or during an actual processing operation in the furnace. At the time of the second heating step, there are present, in the pores of the block, very fine particles which have remained in the pores after the second soaking step. During the second heating step, the material in these particles develops a ceramic bond to the refractory material which formed, in the pores during the first heating step, as additional layers on the grains of refractory material originally in the block. Also, during the second heating step, the material which formed during the first heating step develops a ceramic bond to the refractory material originally in the block (except in example F).

More particularly, in all of examples A through E and G, during the second heating step, the chromia formed during the first heating step develops a ceramic bond and/or is chemically bonded to the refractory material originally in the block. In examples A, B and G, the chromia is bonded to magnesia, in examples C and D, the chromia is bonded to silica and, in example E, the chromia is bonded to alumina.

Similarly, during the second heating step, in example A, the alumina in the very fine particles remaining from the second soaking step is bonded to the chromia formed during the first heating step; in examples B and C, the silica in the very fine particles is bonded to the chromia; and in examples D, E and G, the magnesia in the very fine particles is bonded to the chromia. In example F, the chromia in the very fine particles is bonded to the silica formed during the first heating step.

Impregnation of the refractory by the impregnating liquids may be enhanced by boiling the impregnating liquid with the refractory body soaking in the liquid or by employing a vacuum technique in which the refractory body is placed under a vacuum before the body is soaked in the impregnating liquid. The impregnating liquid is then introduced into the evacuated chamber containing the refractory body to engulf the latter following which the vacuum is released. Both of these enhancement techniques are applicable to any soaking step involving an impregnating liquid, and both techniques function to remove air from the pores of the refractory body thereby to enhance impregnation.

The foregoing detailed description has been given for clearness of understanding only, and no unnecessary limitations should be understood therefrom, as modifications will be obvious to those skilled in the art.

I claim:

1. A method for improving the resistance to slag penetration of a refractory lining block for a furnace in which is conducted a process which produces slag, said method comprising the steps of:

forming a porous block of uncured refractory material consisting essentially of relatively coarse grains of a first refractory material in a matrix of relatively fine grains of a refractory material which is compatible with the refractory material in said coarse grains;

sintering said block to form a fully cured block, less porous than the unsintered block, but having some pores extending from the surface of said block inwardly along the matrix between coarse grains, said pores having cross-sectional spaces which are sufficiently large to permit penetration by said slag;

soaking said block in a first liquid which penetrates said pores and impregnates said block, said first liquid having a composition which reacts with refractory material in said block to form, in said matrix, a reaction product which is compatible with all the refractory material in said block and which, upon formation, reduces the size of the cross-sectional spaces in said pores to decrease the penetrability of said pores by said slag;

removing said block from said liquid and heating the block, while still impregnated with said first liquid, to promote said reaction to fuse together, by the heat of the reaction, discrete portions of said reaction product;

soaking said block, after said heating step, in a second liquid differing in composition from said first liquid and containing very fine particles of a refractory material which is compatible with the refractory material of which said block is composed and with said reaction product, to impregnate said block with said second liquid and deposit said very fine particles in said pores, to further decrease the penetrability of said pores by said slag;

said very fine particles penetrating said pores during said last recited soaking step; and assembling said block into a refractory lining in said furnace.

2. A method as recited in claim 1 wherein:
said heating step is conducted at a temperature no higher than that necessary to promote said reaction.

3. A method as recited in claim 1 wherein:
said block is composed of coarse grains of alumina in a matrix of fine grains of chromia and alumina; and
said first liquid is phosphoric acid.

4. A method as recited in claim 1 wherein: said reaction product expands to fill said pores.

5. A method as recited in claim 4 wherein: said reaction product expands in an exfoliative manner.

6. A method as recited in claim 1 wherein:
the refractory material of said very fine particles is reactive with said first liquid to produce a reaction product which is compatible with the refractory material in said block and which will be retained within said pores.

7. A method as recited in claim 6 wherein:
said block contains residual first liquid, at the time of said second soaking step, to react with said very fine particles to produce said last-recited reaction product.

8. A method as recited in claim 6 and comprising:
soaking said block a second time in said first liquid, after said very fine particles have deposited in said pores, to produce said last-recited reaction product.

9. A method as recited in claim 6 wherein:
said block is composed of coarse grains of alumina in a matrix of fine grains of chromia and alumina;
said first liquid is phosphoric acid; and
said very fine particles are composed of alumina.

10. A method as recited in claim 9 wherein:
said coarse grains of alumina have a size of plus 100 mesh;
said fine grains of alumina have a size of minus 100 mesh;
said fine grains of chromia have a size of minus 200 mesh; and
said very fine particles of alumina have a size of minus 600 mesh.

11. A method for improving the resistance to slag penetration of a refractory lining block for a furnace in which is conducted a process which produces slag, said method comprising the steps of:

forming a porous block of uncured refractory material;

sintering said block to form a fully cured block, less porous than the unsintered block, but having some pores extending inwardly from the surface of said block, said pores having cross-sectional spaces which are sufficiently large to permit penetration by said slag;

soaking said block in a first liquid which penetrates said pores and impregnates said block;

heating said impregnated block under conditions which forms, from at least said first liquid, a product which is compatible with all the refractory material in said block and which, upon formation, reduces the size of the cross-sectional spaces in said pores to decrease the penetrability of said pores by said slag;

soaking said block, after said heating step, in a second liquid differing in composition from said first liquid and containing very fine particles of a refractory material which is compatible with the refractory material of which said block is composed and with said product formed during said heating step, to impregnate said block with said second liquid and deposit said very fine particles in said pores, to further decrease the penetrability of said pores by said slag;

said very fine particles penetrating said pores during said last recited soaking step; and assembling said block into a refractory lining in said furnace.

12. A method as recited in claim 11 wherein:
said very fine particles have a size of minus 1 micron.

13. A method as recited in claim 11 wherein:
said first impregnating step comprises boiling the first liquid to agitate and expel, from the pores of said refractory block, air entrapped within said pores.

14. A method as recited in claim 11 wherein at least one of said soaking steps comprises:
placing said refractory block under a vacuum before said soaking step;
introducing said impregnating liquid for said soaking step to engulf the refractory block while it is under said vacuum; and
then releasing said vacuum.

15. A method as recited in claim 11 wherein at least one of said soaking steps comprises:
boiling said impregnating liquid for said soaking step to agitate and expel, from the pores of said refractory block, air entrapped within said pores.

16. A method as recited in claim 11 and comprising:
reacting, within said pores, the refractory material of said very fine particles with a compound at least part of which originates with said first liquid to produce a reaction product which is compatible with the refractory material in said block and which will be retained within said pores.

17. A method as recited in claim 16 wherein:

said last-recited reacting step comprises firing said refractory block after soaking said block in said second liquid.

18. A method as recited in claim 17 wherein: said firing step occurs before said assembling step.

19. A method as recited in claim 17 wherein: said firing step occurs after said assembling step.

20. A method as recited in claim 16 wherein:

said refractory block is composed of a material consisting essentially of at least one of the group magnesia, silica, alumina and chromia;

said first liquid is composed of chromic acid; and the very fine particles are composed of at least one of the group alumina, silica, magnesia, chromia.

21. A method as recited in claim 20 wherein:

said second liquid comprises a suspension of very fine particles composed of either silica or chromia suspended in a liquid reagent containing $SiO_3^{--}$ ion.

22. A method as recited in claim 20 wherein:

said block which has been impregnated with chromic acid is heated during said first-recited heating step under reducing conditions to form chromia.

23. A method as recited in claim 22 wherein:
said last-recited reacting step comprises firing said refractory block after soaking said block in said second liquid to form a bond between said chromia and said material of which the refractory block is composed and to form a bond between said chromia and said very fine particles.

24. A method as recited in claim 16 wherein:

said refractory block is composed of a material consisting essentially of silica;

said first liquid is silicic acid;

said first recited heating step forms silica from said silicic acid and the silica so formed is formed as an additional layer upon the silica of which said block is composed; and said second liquid is composed of a suspension of very fine particles of chromia suspended in a liquid reagent containing $SiO_3^{--}$ ion.

25. A method as recited in claim 24 wherein:

said last-recited reacting step comprises firing said refractory block to form a chemical bond between said chromia from said very fine particles and the silica in said refractory block.

* * * * *

UNITED STATES PATENT AND TRADEMARK OFFICE
CERTIFICATE OF CORRECTION

PATENT NO. : 4,290,984
DATED : September 22, 1981
INVENTOR(S) : LeRoy J. Gaffney It is certified that error appears in the above-identified patent and that said Letters Patent are hereby corrected as shown below:

Col. 4, line 37, "first step" should be --firing step--.

Signed and Sealed this

Sixteenth Day of February 1982

[SEAL]

Attest:

GERALD J. MOSSINGHOFF

Attesting Officer     Commissioner of Patents and Trademarks